United States Patent [19]
Kronenberg

[11] 3,951,685
[45] Apr. 20, 1976

[54] NONAQUEOUS CELL UTILIZING A 3Me2Ox-BASED ELECTROLYTE

[75] Inventor: Marvin L. Kronenberg, Cleveland Heights, Ohio

[73] Assignee: Union Carbide Corporation, New York, N.Y.

[22] Filed: Feb. 25, 1975

[21] Appl. No.: 552,997

[52] U.S. Cl.............................. 136/6 LN; 136/154
[51] Int. Cl.².......................................... H01M 10/08
[58] Field of Search ............ 136/6 LN, 100 R, 153, 136/154, 155, 83 R

[56] References Cited
UNITED STATES PATENTS

| | | | |
|---|---|---|---|
| 3,778,310 | 12/1973 | Garth | 136/100 R |
| 3,871,916 | 3/1975 | Kronenberg | 136/6 LN |

*Primary Examiner*—Howard S. Williams
*Assistant Examiner*—H. A. Feeley
*Attorney, Agent, or Firm*—Cornelius F. O'Brien

[57] ABSTRACT

A nonaqueous cell utilizing a highly active metal anode, such as lithium, a solid CuO cathode and a liquid organic electrolyte consisting essentially of 3-methyl-2-oxazolidone in combination with a low viscosity cosolvent, such as tetrahydrofuran, and a metal salt selected, for example, from the group consisting of MSCN, $MCF_3SO_3$, $MBF_4$, $MClO_4$ and $MM'F_6$ wherein M is lithium, sodium or potassium and M' is phosphorus, arsenic or antimony.

10 Claims, No Drawings

NONAQUEOUS CELL UTILIZING A 3Me2Ox-BASED ELECTROLYTE

FIELD OF THE INVENTION

This invention relates to a nonaqueous cell utilizing a highly active metal anode, a solid CuO cathode and a liquid organic electrolyte based on 3-methyl-2-oxazolidone in conjunction with a low viscosity cosolvent and a selected solute.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as copper oxide. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solutes is known and recommended for use but the selection of a suitable solvent has been particularly troublesome since many of those solvents which are used to prepare electrolytes sufficiently conductive to permit effective ion migration through the solution, are reactive with the highly reactive anodes described above. Most investigators in this area, in search of suitable solvents, have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with extremely high energy density cathode materials, such as copper oxide, and were sufficiently corrosive to lithium anodes to prevent efficient performance over any length of time.

U.S. Pat. No. 3,547,703 to Blomgren et al discloses the use of a nonaqueous battery electrolyte employing a solute dissolved in ethylene glycol sulfite.

U.S. Pat. Nos. 3,769,092 to V. L. Dechenaux and 3,778,310 to B. H. Garth disclose nonaqueous cell systems wherein copper oxide electrodes in conjunction with specific organic electrolytes and highly active metal anodes have been used.

In an article appearing in Abstracts of the Third International Conference on Nonaqueous Solvents, July 5-7, 1972, Michigan State University, an abstract by H. L. Hoffman, Jr. and P. G. Sears discloses that 3-methyl-2-oxazolidone has been found to be a good nonaqueous solvent because of its ease of synthesis and purification, stability, attractive physical properties, broad dissolving power and coordinating ability. The article mainly related to the disclosure that the basic physical and chemical characteristics of 3-methyl-2-oxazolidone qualified it as a good potential nonaqueous solvent.

U.S. Pat. application Ser. No. 462,792 filed on Apr. 22, 1974 by the same applicant as the subject invention discloses a nonaqueous cell utilizing a highly active metal anode, a solid $(CF_x)_n$ cathode and a liquid organic electrolyte based on 3-methyl-2-oxazolidone in conjunction with a low viscosity cosolvent and a selected solute.

While the theoretical energy, i.e., the electrical energy potentially available from a selected anode-cathode couple, is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a non-aqueous electrolyte will function with a selected couple. Thus a cell must be considered as a unit having three parts, a cathode, an anode and an electrolyte, and it is to be understood that the parts of one cell are not predictably interchangeable with parts of another cell to produce an efficient and workable cell.

It is an object of the present invention to provide a nonaqueous cell employing among other components a liquid organic electrolyte consisting essentially of 3-methyl-2-oxazolidone in combination with at least one low viscosity cosolvent and a solute.

It is a further object of the present invention to provide a nonaqueous cell which utilizes a highly active metal anode, a solid CuO cathode and a liquid organic electrolyte consisting essentially of 3-methyl-2-oxazolidone in combination with a low viscosity cosolvent and a solute.

It is a further object of the invention to provide an electrolyte solvent system for nonaqueous solid CuO cathode cells which comprises 3-methyl-2-oxazolidone in combination with at least one low viscosity cosolvent and a solute.

It is a further object of this invention to provide a nonaqueous cell which utilizes a highly active metal anode, a solid CuO cathode and a liquid organic electrolyte consisting essentially of 3-methyl-2-oxazolidone in combination with a low viscosity cosolvent and a solute that will yield a cathode efficiency above about 50% and preferably above about 75% during discharge as based on a drain of 1 ma/cm$^2$ to 1.0 volt cutoff using a lithium anode cell.

SUMMARY OF THE INVENTION

The invention provides a novel high energy density nonaqueous cell comprising a highly active metal anode, a solid CuO cathode and a liquid organic electrolyte consisting essentially of 3-methyl-2-oxazolidone in combination with at least one low viscosity cosolvent and a conductive solute.

Highly active metal anodes suitable for this invention include lithium (Li), potassium (K), sodium (Na), calcium (Ca), magnesium (Mg) and their alloys. Of these active metals, lithium would be preferred because in addition to being a ductile, soft metal that can easily be assembled in a cell, it possesses the highest energy-to-weight ratio of the group of suitable anode metals.

The copper oxide cathodes for use in this invention may be made by any suitable method known to those skilled in the battery art.

Liquid organic 3-methyl-2-oxazolidone material, (3Me2Ox),

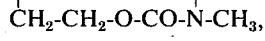
$\overline{CH_2-CH_2-O-CO-N-CH_3}$, is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution becomes too high for its efficient use as an electrolyte for nonaqueous cell applications other than those requiring very low current drains. Thus in accordance with this invention, the addition of a low viscosity cosolvent is necessary if 3Me2Ox is to be used as an electrolyte for nonaqueous cells which can operate or perform at a high energy density level. Specifically, in order to obtain a high energy density level in accordance with this invention, it is essential to use a CuO cathode along with a highly active metal anode. Thus this invention is directed to a novel high energy density cell having a highly active metal anode, such as lithium, a CuO cathode, and an electrolyte comprising 3Me2Ox in combination with at least one low viscosity cosolvent and a conductive solute. The CuO cathode efficiency, as based on the percentage of the theoretical capacity of the CuO material available in a cell operating on a drain of 1 milliampere per square centimeter to a 1.0 volt cutoff using a lithium anode, will be above about 50% and preferably above about 75% according to this invention.

The low viscosity cosolvents for use in this invention include tetrahydrofuran (THF), dioxolane, dimethoxyethane (DME), dimethyl isoxazole (DMI), diethyl carbonate (DEC), ethylene glycol sulfite (EGS), dioxane, dimethyl sulfite (DMS) or the like. Tetrahydrofuran and dioxolane are preferred cosolvents because of their compatibility with metal salts dissolved in liquid 3Me2Ox and their chemical inertness to cell components. Specifically, the total amount of the low viscosity cosolvent added should be between about 20% and about 80% based on total solvent volume, i.e., exclusive of solute, so as to lower the viscosity to a level suitable for use in a cell.

Conductive solutes (metal salts) for use in this invention with the liquid 3Me2Ox may be selected from the group $MCF_3SO_3$, MSCN, $MBF_4$, $MClO_4$ and $MM'F_6$ wherein M is lithium, sodium or potassium, and M' is phosphorus, arsenic or antimony. The addition of the solute is necessary to improve conductivity of 3Me2Ox so that said 3Me2Ox can be used as the electrolyte in nonaqueous cell applications. Thus the particular salt selected has to be compatible and non-reactive with 3Me2Ox and the electrodes of the cell. The amount of solute to be dissolved in the liquid 3Me2Ox should be sufficient to provide good conductivity, e.g., at least about $10^{-4}$ $ohm^{-1}$ $cm^{-1}$. Generally an amount of at least about 0.5 M would be sufficient for most cell applications.

The present invention of a high energy density cell with a 3Me2Ox-based electrolyte, a solid CuO cathode and a highly active metal anode will be further illustrated in the following examples.

EXAMPLE I

The viscosity of several samples of 3Me2Ox, with and without a conductive solute and/or a low viscosity cosolvent, were obtained using a Cannon-Fenske viscometer. The data obtained are shown in Table 1 and clearly demonstrate the high viscosity of a solution of 3Me2Ox containing a dissolved conductive solute. As shown in sample 2, when one mole of $LiClO_4$ is added to one liter of 3Me2Ox, the viscosity of the solution was found to be 6.61 centistokes. In sample 6, when one mole of the same metal salt, $LiClO_4$, was added to one liter of equal parts of 3Me2Ox and tetrahydrofuran (THF), the viscosity of the solution was found to be only 2.87. Thus it is clearly shown that the viscosity of a solution of 3Me2Ox and a metal salt can be decreased by the addition of a specifically selected low viscosity cosolvent.

Table 1

| Sample | Solvent and Salt | Viscosity (Centistokes) |
|---|---|---|
| 1 | 3Me2Ox; no salt | 2.16 |
| 2 | 3Me2Ox; 1 M $LiClO_4$ | 6.61 |
| 3 | 3Me2Ox; 1 M LiBr | 7.58 |
| 4 | 50–50 3Me2Ox, THF; no salt | 1.05 |
| 5 | 50–50 3Me2Ox, THF; 1 M $LiAsF_6$ | 3.59 |
| 6 | 50–50 3Me2Ox, THF; 1 M $LiClO_4$ | 2.87 |
| 7 | 25–75 3Me2Ox, THF; 1 M $LiAsF_6$ | 2.08 |
| 8 | 25–75 2Me2Ox, dioxolane; 1 M $LiAsF_6$ | 1.83 |
| 9 | 25–75 3Me2Ox, THF; 1 M $LiClO_4$ | 1.99 |

EXAMPLE II

Each of four flat-type cells was constructed utilizing a nickel metal base having therein a shallow depression into which the cell contents were placed and over which a nickel metal cap was placed to close the cell. The contents of each sample cell consisted of a 1.0 inch diameter lithium disc consisting of five sheets of lithium foil, having a total thickness of 0.10 inch, about 4 ml of a specific electrolyte as shown in Table 3, a 1.0 inch diameter porous nonwoven polypropylene separator (0.01 inch thick) which absorbed some of the electrolyte, and a solid CuO cathode mix compressed onto and into a porous 1.0 inch diameter cathode collector.

The copper oxide electrodes were made of a mixture of CuO (made by the reaction of fine copper powder in air at an elevated temperature of about 400°C for about 15 hours), acetylene black and a polytetrafluoroethylene binder compression-molded onto both sides of a nickel expanded mesh. The CuO and acetylene black were first micromilled together, then blended with water, ethanol and a polytetrafluoroethylene emulsion (obtained commercially from Du Pont as Teflon emulsion designated T-30-B) in the proportions shown in Table 2 prior to draining off the excess liquid and compression molding (at 18,000 psi) onto the expanded metal carrier or mesh. Each finished CuO electrode contained about 1.9 grams of the cathode mix and had a thickness of about 0.04 inch with a diameter of about 1.0 inch.

Table 2

| Materials | Amount | % in Finished Electrode |
|---|---|---|
| CuO | 20.0 g | 87.5 |
| "Teflon" emulsion | 2.86 g | 7.5 |
| Acetylene black | 1.14 g | 5.0 |
| Ethanol | 20.0 ml | — |
| $H_2O$ | 110.0 ml | — |

The total thickness of the anode, cathode plus cathode collector and separator for each cell measured about 0.15 inch. The open circuit voltage and discharge capacity on a 1.0 milliampere per square centimeter drain to a 1.0 volt cutoff were obtained for each cell and are shown in Table 3. Since the cells were cathode-limited, the cathode efficiency was calculated as a percentage based on the theoretical capacity of the cathode material available in each cell.

For example, the theoretical efficiency of CuO as a cathode material in a lithium anode cell discharging at a 1 milliampere per square centimeter drain to a 1.0 volt cutoff, is calculated as follows: Assuming the reaction:

$$2 Li + CuO \rightarrow Li_2O + Cu$$

13.88g Li + 79.54g CuO → 29.88g $Li_2O$ + 63.54g Cu (2 equiv. wt.) (2 equiv. wt.) (2 equiv. wt.) (2 eqiv. wt.)

then if 1 gram (g) CuO is used, the fraction of the equivalent weight is 1/39.77. Since one Faraday of electricity is obtained from one equivalent weight, then the AH per equivalent weight is calculated as follows:

$$\frac{96,500 \text{ coulombs/Faraday}}{3600 \text{ coulombs/AH}} = 26.8$$

AH/equivalent weight.
Therefore, 1/39.77 equivalent weight × 26.8 AH/equivalent weight = 0.676 AH. This 0.676 AH or 676 mAH is the theoretical capacity of 1 gram of CuO material when used as a cathode in a lithium anode cell and, by using this value as a reference, the cathode efficiency of CuO material can be calculated when used as a cathode in a cell having various electrolytes.

As demonstrated by the test data shown in Table 3, the cathode efficiency of the cells ranged from 75.1% to 81.8% depending on the cosolvent(s) used. Thus using the teachings of the subject invention, efficient, high energy density CuO nonaqueous cells can be made.

electrolyte based on 3Me2Ox in combination with a selected low viscosity cosolvent and a selected salt in accordance with this invention.

Table 4

| Sample | Electrolyte Solvent Containing 2M LiClO₄ | Theoretical capacity (mAh) | Discharge Capacity to 1.0v Cutoff (mAh) | Cathode Eff. % |
|---|---|---|---|---|
| 1* | 30 v/o 3Me2Ox 70 v/o THF | 979 | 750 | 76.6 |
| 2** | 30 v/o 3Me2Ox 30 v/o DME 40 v/o Dioxolane | 990 | 840 | 84.8 |

*open circuit voltage 2.8 volts
**open circuit voltage 2.6 volts

EXAMPLE IV

A flat-type cell was constructed as described in Example II, using the same cell components except that the electrolyte employed in the cell was 2M $LiAsF_6$ in a mixture of 40v/o dioxolane, 30v/o DME and 30v/o 3-Me2Ox. The cell, tested on a 1.0 milliampere per square centimeter drain to a 1.0 volt cutoff, delivered a discharge capacity of 765 mAh.

Based on a theoretical capacity of 994 mAh, the cathode efficiency of the cell was 76.9%. Again this test showed that high cathode utilization can be obtained from a CuO cathode in a nonaqueous cell system when using a liquid organic electrolyte consisting essentially of 3Me2Ox in combination with at least one selected low viscosity cosolvent and a selected metal salt.

EXAMPLE V

Six flat type cells were constructed as described in Example II, using the same cell components except that the electrolyte employed in each cell is as shown in Table 5. Each cell was discharged across a 300-ohm load to a 1.0 volt cutoff. The discharge capacity and cathode efficiency observed for each cell (samples 1–5) are shown in Table 5 and clearly illustrate the high Table 3

| Sample | Electrolyte-Solvent | Electrolyte Salt | O.C.V. (Volt) | Theoretical Capacity (mAh) | Disch. Cap. to 1.0V Cutoff (mAh) | Cathode Eff. % |
|---|---|---|---|---|---|---|
| 1 | 30 vol.%(v/o) 3Me2Ox 70 v/o THF | 2 M LiBF₄ | 2.75 | 1063 | 870 | 81.8% |
| 2* | 30 v/o 3Me2Ox 70 v/o THF | 1 M LiBF₄ | 2.95 | 1088 | 817 | 75.1% |
| 3 | 30 v/o 3Me2Ox 30 v/o DME 40 v/o Dioxolane | 2 M LiBF₄ | 3.0 | 965 | 750 | 77.7% |
| 4** | 30 v/o 3Me2Ox 40 v/o THF 30 v/o DME | 2 M LiBF₄ | 2.85 | 1072 | 834 | 77.8% |

*after 5 days on 5-mA current drain the cell was discharged across a 300-ohm load at ~0.8mA/cm²
**after 6 days on 5-mA current drain the cell was discharged across a 300-ohm load at ~0.8mA/cm²

EXAMPLE III

Two flat type cells were constructed as described in Example II, using the same cell components except that the electrolyte employed in each cell is as shown in Table 4. Each cell was tested as described in Example II and the discharge capacity and cathode efficiency observed for each cell are shown in Table 4. As evidenced by the data in Table 4, high cathode utilization can be obtained from CuO cathodes when using an cathode utilization obtainable from CuO cathodes when using an electrolyte based on 3Me2Ox in combination with a selected low viscosity cosolvent and a selected salt. The test data for sample 6 in Table 5 shows that when the electrolyte consisted of 1M $LiCF_3SO_3$ in pure dioxolane, the cell could not be usefully discharged when coupled to a 300-ohm load. Although the reason for this is not precisely known, it could partially be due to the fact that the conductivity of the pure dioxolane electrolyte was measured as being 2.5 ×

$10^{-4}$ ohm$^{-1}$ cm$^{-1}$ while the conductivity of the 50:50 dioxolane-2Me2Ox electrolyte was measured as being $6.5 \times 10^{-3}$ ohm$^{-1}$ cm$^{-1}$.

Table 5

| Sample | Electrolyte-Solvent | Electrolyte Salt | O.C.V. (Volt) | Theoretical Capacity (mAh) | Disch. Cap. to 1.0V Cutoff (mAh) | Cathode Eff. % |
|---|---|---|---|---|---|---|
| 1 | 50 vol.%(v/o) 3Me2Ox 50 v/o dioxolane | 1 M LiCF$_3$SO$_3$ | 2.75 | 970 | 757 | 78 |
| 2 | 50 v/o 3Me2Ox 50 v/o dioxolane | 2 M LiCF$_3$SO$_3$ | 2.40 | 1016 | 790 | 77.8 |
| 3 | 50 v/o 3Me2Ox 50 v/o THF | 2 M LiCF$_3$SO$_3$ | 2.60 | 993 | 705 | 71 |
| 4 | 30 v/o 3Me2Ox 40 v/o dioxolane 30 v/o DME | 1 M LiCF$_3$SO$_3$ | 2.80 | 1019 | 857 | 84.1 |
| 5 | 30 v/o 3Me2Ox 40 v/o dioxolane 30 v/o DME | 2 M LiCF$_3$SO$_3$ | 2.75 | 1006 | 841 | 83.6 |
| 6* | dioxolane | 1 M LiCF$_3$SO$_3$ | 2.55 | — | — | — |

*would not discharge across 300-ohm load

While the present invention has been described with reference to many particular details thereof, it is not intended that these details shall be construed as limiting the scope of this invention.

What is claimed is:

1. A nonaqueous cell comprising a highly active metal anode, a solid CuO cathode and a liquid organic electrolyte consisting essentially of 3-methyl-2-oxazolidone in combination with at least one low viscosity cosolvent and a conductive solute.

2. The nonaqueous cell of claim 1 wherein said low viscosity solvent is selected from the group consisting of tetrahydrofuran, dioxolane, dimethoxyethane, dimethyl isoxazole, diethyl carbonate, ethylene glycol sulfite, dioxane and dimethyl sulfite.

3. The nonaqueous cell of claim 1 wherein said conductive solute is selected from the group consisting of MCF$_3$SO$_3$, MSCN, MBF$_4$, MClO$_4$ and MM'F$_6$ wherein M is lithium, sodium or potassium and M' is phosphorus, arsenic or antimony.

4. The nonaqueous cell of claim 1 wherein said active metal anode is selected from the group consisting of lithium, potassium, sodium, calcium, magnesium and alloys thereof.

5. The nonaqueous cell of claim 2 wherein said conductive solute is selected from the group consisting of MSCN, MCF$_3$SO$_3$, MBF$_4$, MClO$_4$ and MM'F$_6$ wherein M is lithium, sodium or potassium and M' is phosphorus, arsenic or antimony.

6. The nonaqueous cell of claim 3 wherein said low viscosity cosolvent is selected from the group consisting of tetrahydrofuran, dioxolane, dimethoxyethane, dimethyl isoxazole, diethyl carbonate, ethylene glycol sulfite, dioxane and dimethyl sulfite.

7. The nonaqueous cell of claim 5 wherein said active metal anode is selected from the group consisting of lithium, potassium, sodium, calcium, magnesium and alloys thereof.

8. The nonaqueous cell of claim 6 wherein said active metal anode is selected from the group consisting of lithium, potassium, sodium, calcium, magnesium and alloys thereof.

9. The nonaqueous cell of claim 1 wherein said active metal anode is lithium, said low viscosity cosolvent is tetrahydrofuran and said conductive solute is selected from the group consisting of LiBF$_4$, LiClO$_4$ and LiCF$_3$SO$_3$ 10. The nonaqueous cell of claim 1 wherein said active metal anode is lithium, said low viscosity cosolvent is dioxolane, and said conductive solute is selected from the group consisting of LiBF$_4$, LiClO$_4$ and LiCF$_3$SO$_3$.

* * * * *

Disclaimer 3,951,685.—*Marvin L. Kronenberg*, Cleveland Heights, Ohio. NONAQUEOUS CELL UTILIZING A 3Me20x-BASED ELECTROLYTE. Patent dated Apr. 20, 1976. Disclaimer filed Apr. 20, 1976, by the assignee, *Union Carbide Corporation*.

The term of this patent subsequent to Mar. 18, 1992, has been disclaimed.

[*Official Gazette June 15, 1976.*]